United States Patent [19]

Berrié et al.

[11] 4,022,307
[45] May 10, 1977

[54] DEVICE FOR DRIVING A TRANSFER BEAM

[75] Inventors: Yves Berrié; Claude Sebire; Francois Dollé, all of Boulogne-Billancourt, France

[73] Assignees: Regie Nationale des Usines Renault, Hauts de Seine; Automobiles Peugeot, Paris, both of France

[22] Filed: Nov. 14, 1975

[21] Appl. No.: 631,942

[30] Foreign Application Priority Data

Nov. 14, 1974 France .............................. 74.37574

[52] U.S. Cl. .......................... 192/12 D; 192/103 R; 192/143; 192/146; 192/147
[51] Int. Cl.² ......................................... F16D 67/06
[58] Field of Search ........... 192/12 D, 18 B, 103 R, 192/143, 146, 147

[56] References Cited
UNITED STATES PATENTS

| | | |
|---|---|---|
| 2,816,635 | 12/1957 | Danly et al. .................... 192/147 X |
| 3,157,261 | 11/1964 | Bono .............................. 192/146 X |
| 3,587,798 | 6/1971 | Schuman ......................... 192/12 D |
| 3,590,969 | 7/1971 | Kajitani et al. .................... 192/146 |
| 3,599,764 | 8/1971 | Daab et al. ..................... 192/103 R |
| 3,633,718 | 1/1972 | Wanner et al. ..................... 192/146 |

*Primary Examiner*—Allan D. Herrmann
*Attorney, Agent, or Firm*—Fleit & Jacobson

[57] ABSTRACT

The invention relates to a device for driving a transfer beam for handling relatively heavy loads, comprising in the case of a beam having a rack rigidly associated therewith. Said device consists essentially of a transmission incorporating between the driving motor and the pinion in meshing engagement with the rack a clutch and a brake both controlled by electromagnetic means, servo means for supplying electric current to each electromagnetic control of said clutch and brake, and a pair of servo-generators adapted to monitor the one the acceleration phase of the transfer beam from the standstill position of said beam and the other the deceleration phase before stopping the beam.

4 Claims, 1 Drawing Figure

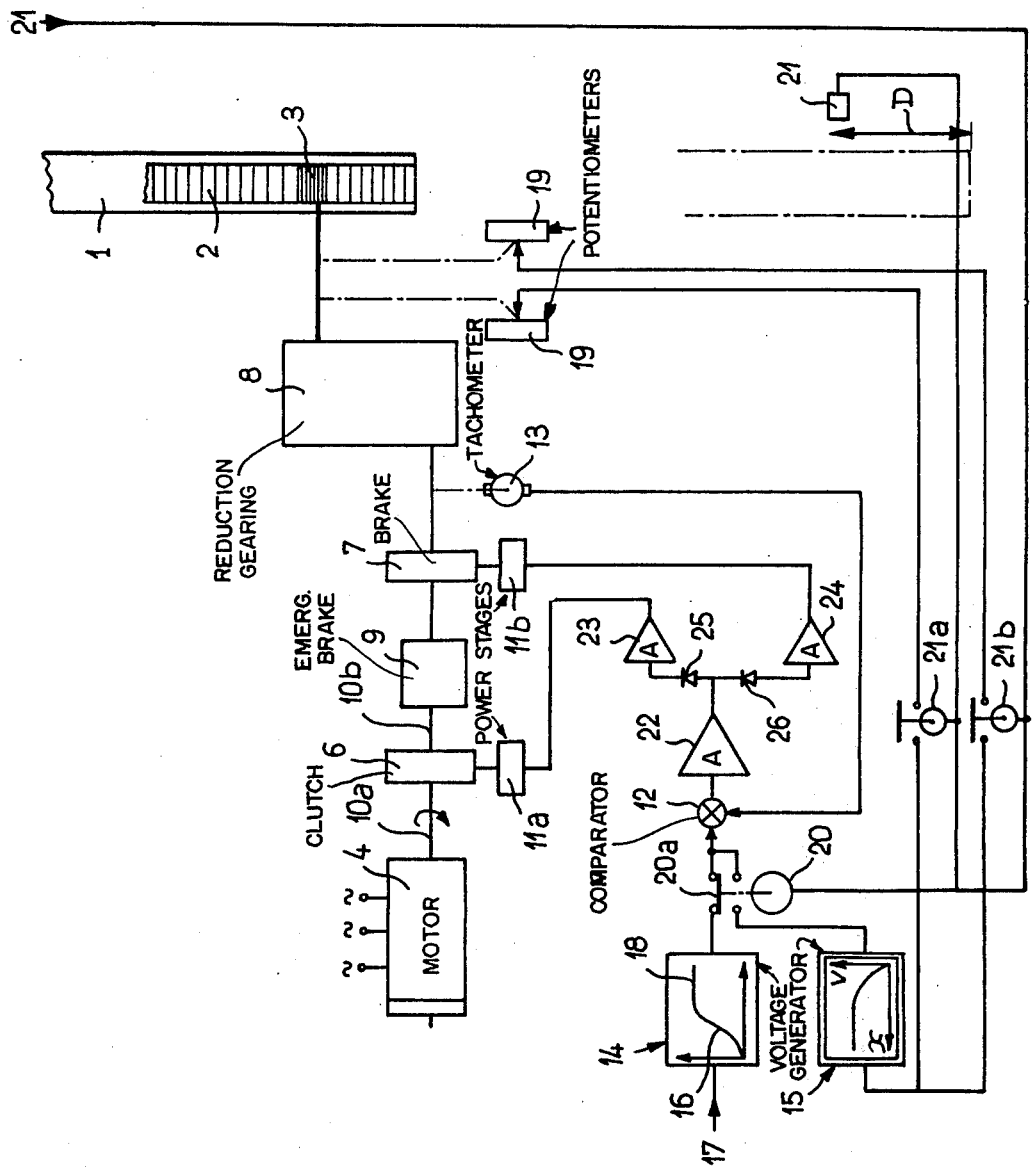

DEVICE FOR DRIVING A TRANSFER BEAM

The present invention relates to devices for driving transfer beams intended more particularly for handling relatively heavy loads, such devices being of the type wherein the transfer beam comprises a rack in meshing engagement with a pinion driven from a motor in either direction of rotation for imparting controlled reciprocating movements to the transfer beam.

In the handling of heavy loads in production lines, for example the shifting of vehicle bodies between welding stations in the motor industry, a known problem to be solved consists in obtaining rapid movements in order to reduce idle periods during a manufacturing process while obtaining a relatively accurate final positioning. Now the vis inertia of the transfer assembly and also of the loads makes it necessary to provide an initial acceleration phase and a final deceleration phase during each movement.

Typical prior art solutions for coping with this problem included transmission systems comprising a roller movable in a suitable variable-pitch helix formed in a rotary driving drum, but this system is attended by considerable stress and wear and therefore requires frequent adjustments and mechanical repairs involving in turn extremely detrimental and expensive hold-ups of the production line.

It is the essential object of the present invention to provide a device for driving a transfer beam which constitutes a satisfactory solution to the problem set forth hereinabove while eliminating the inconveniences of prior art systems, this device being characterised essentially in that it comprises in the transmission between the motor and the rack pinion a clutch and a brake both controlled by separate electromagnetic means, servo means for controlling the energization of each electromagnetic control of said clutch and brake, said servo means comprising a comparator having one input supplied with current from a tachometric generator operatively connected to the members driving said rack pinion for delivering the real velocity data, and a reference velocity data input, the output of said comparator being connected via amplifiers responsive to the polarity of the output signal on the one hand to a stage supplying electric power to the electromagnetic control means of said clutch and on the other hand to a stage supplying electric power to the electromagnet control means of said brake, and two servo-generators adapted to monitor the one the acceleration phase of the transfer beam from its standstill condition and the other the deceleration phase before stopping the beam, both servo-generators being connected to the reference velocity data input via switching means adapted to put one or the other servo-generator into operation in response to predetermined positions of the transfer beam. Thus, the hard stress caused by the acceleration and deceleration of the beam are absorbed by clutch means designed for this purpose and selected preferably from the range of so-called powder clutches, which cannot impair the desired degree of precision that can be expected from a device of this character.

A typical form of embodiment of a transfer beam driving device according to this invention will now be described by way of example with reference to the attached drawing of which the single FIGURE is a diagrammatic block and wiring diagram of this driving device.

In the drawing, the transfer beam 1 to which reciprocating movements are to be imparted is rigid with a rack 2 in constant meshing engagement with a pinion 3 driven in this example from an asynchronous motor 4 to which a conventional ON-OFF and reversing switch (not shown) is associated.

The drive between the motor 4 and pinion 3 comprises a clutch 6 controlled by electromagnetic means, a brake 7 also controlled by electromagnetic means, and a reduction gearing 8, in this order, an emergency brake 9 being also provided for obvious safety reasons.

Preferably, the clutch 6 and brake 7 are of the well-known powder type, i.e. comprising two members mounted for relative rotation and separated by a gap filled with ferrous metal powder capable when exposed to a magnetic field created between these members of coupling these members with a torque proportional to the force of said field, which is zero when no magnetic field is produced with a force sufficient to magnetize the metal powder. Thus, the two members constituting the clutch 6 are rigid the one with the output shaft 10a of the motor and the other with the transmission shaft 10b extending from the clutch to the reduction gearing 8. Mounted on this shaft 10b is one of the rotary members of brake 7 having its other member held in a fixed position, i.e. anchored to some fixed portions of a frame structure, the same applying to the emergency brake 9 which, of course, may be of any suitable and known type.

The power for energizing the magnetic field generators, i.e. the control coils of clutch 6 and brake 7, is supplied via power stages 11a and 11b of a servo system arranged as follows:

This system includes a comparator 12 having a first input supplied with electric current from a tachometric generator 13 connected to the transmission driving the pinion 3, in this case the shaft 10b, and adapted to deliver voltage data corresponding to the real velocity of the transfer beam 1.

This comparator 12 further includes another input adapted to be connected to one or the other of a pair of function or servo-generators 14, 15 capable of delivering a voltage corresponding to the reference velocity of said transfer beam 1.

The servo-generator 14 is adapted to monitor the acceleration of the beam up to a predetermined velocity level and comprises to this end a commercially available adjustable-slope integrator in which the voltage increment grade per time unit, illustrated diagrammatically at 16, depends on the value of a voltage fed to its input 17, the voltage level illustrated at 18 corresponding to the saturation voltage of the integrator. The end angles of the curve may be rounded as illustrated by using a filter in a manner well known to those conversant with the art.

The other servo-generator 15 is adapted to monitor the deceleration phase of the beam 1 preliminary to the stopping thereof, and comprises to this end a commercially available square root extractor of which the input voltage is subordinate, for each terminal portion of the beam stroke (as will be explained presently) to a potentiometer 19 of the rotary type rotatably coupled to the shaft driving the pinion 3.

Either of these servo-generators 14, 15 may be connected to the comparator 12 via the movable contact 20a of a relay 20 the energization of which is controlled by switch means properly disposed for detecting the momentary position of the beam 1, for example in the form of proximity magnetic detectors or microswitches, such as illustrated at 21 in the drawing, these switch means being disposed in the two end sections of the stroke contemplated for the beam 1. These detectors 21 are electrically connected to the relay 20 and adapted to energise the coil thereof in such a manner that the movable contact 20a of said relay 20 will couple the servo-generator 15 to the comparator 12 during said final sections of the strokes of beam 1 which correspond to a deceleration phase preceding the stoppage thereof.

These detectors 21 are on the other hand coupled separately to a pair of relays 21a and 21b adapted through their relevant movable contacts to select and operate the potentiometer 19 corresponding to the final stroke section concerned. Advantageously, common rotary potentiometers are used for this purpose, these potentiometers 19 being driven with such transmission ratio that they are coupled to the circuit of extractor 15 by the detector 21 and the corresponding relay during one fraction of their last driving revolution. Thus, a voltage dropping gradually to zero value when the beam 1 is brought to a standstill is readily available.

The comparator 12 is followed by an amplifier 22 having its output connected to the inputs of a pair of amplifiers 23, 24 connected in parallel and each responsive to a predetermined polarity of the output of the first amplifier 22, so as to actuate either the power stage 11a for energizing the control coil of clutch 6, or the power stage 11b for energizing the control coil of brake 7, according to the specific output polarity available.

In this arrangement, a pair of diodes 25, 26 acting as noise attenuators are inserted between amplifier 22 and amplifiers 23, 24 and consistent with the polarities to which these amplifiers 23 and 24 are responsive.

The power stages 11a and 11b may notably consist of follower-connected power transistors, but switch-connected power transistors, or thyristors with trigger circuit may also be contemplated for this purpose.

The mode of operation of this drive is clearly apparent.

To shift a load by means of the transfer beam 1 assumed to be initially inoperative at one end of its stroke, the motor 4 is started in the proper direction and a predetermined voltage is fed to the input of the acceleration servo-generator 14 while the movable 20a of relay is caused to couple this generator 14 to the comparator 12. Thus, clutch 6 is gradually energized according to a law responsive to the slope 16 of integrator 14, thus providing a beam acceleration phase extended in time as a function of the selected slope, until the speed level 17 corresponding to a uniform drive is obtained.

Then, when the beam 1 approaches the final section of its stroke, in whih a deceleration must be applied thereto (stroke section D), the corresponding position detector 21 is actuated and controls the relay 20 of which the movable contact 20a disconnects the generator 14 from the comparator 12 while connecting the other generator 15 to this comparator and actuates the relay 21a to insert the corresponding potentiometer 19 into the circuit, whereby the voltage signal fed to said comparator 12 varies according to the square root extraction curve illustrated in the drawing. This curve corrresponds to the function N = kV wherein x denotes the voltage corresponding to the remaining stroke section of the beam 1 before the latter is brought to a standstill, said stroke section being controlled by a potentiometer 19 so as to drop to zero value when the beam 1 is eventually stopped at the desired location, k being a coefficient and V the voltage corresponding to the reference velocity which will drop by itself to zero according to a law leading to a theoretically constant deceleration of transfer beam 1 until this beam is brought to a complete standstill. It will be seen that if desired the assembly may be adjusted in such a manner that when the servo-generator 15 is connected to the comparator 12 it receives from the potentiometer 19 a voltage of same level as that previously delivered by the generator 14 corresponding to level 18.

It is thus clear that with the device of this invention the transfer beam can be driven according to a velocity law adjustable in manner both flexible and accurate by using only electronic means, since the various parameters of the cycle (acceleration, cycle time, positioning) are based on voltages adapted to be modified at will by operating potentiometers, without having to change the power transmission members.

Of course, the use of potentiometers 19 as transducers of the beam position should not be construed as limiting the present invention, for in the present case any analogic or digital transducer may be used and consists for instance of a pulse generator driven from the shaft of pinion 3 and coacting with a negative counter adapted when zeroed to control the deceleration and stoppage of the beam 1.

The means for starting and controlling the direction of rotation of the motor may be either of the manual type or incorporated in an automatic or semi-automatic cycle control device, this control device being adapted to select at the same time the detector 21 of which the circuit will control the relay 20 at the end of the beam stroke.

What is claimed as new is:

1. Device for driving a transfer beam, notably for handling relatively heavy loads, in which the reciprocating transfer beam is rigid with a rack meshing with a pinion driven by a motor in either direction for imparting to and fro movements to said beam, said device further comprising in the transmission from said motor to said pinion a clutch and a brake both controlled by electro-magnetic means, servo means for supplying electric current to each electro-magnetic control of said clutch and brake, said system comprising a comparator having one input supplied with current from a tachometric generator coupled to the transmission member operatively connected to said pinion for supplying real velocity data, and another input for the reference velocity data, the output of said comparator being coupled via amplifiers responsive to the polarity of the output signal on the one hand to a stage supplying electric power to the electro-magnetic clutch control means and on the other hand to another stage supplying electric power to the electro-magnetic brake control means, and a pair of servo generators, one servo generator adapted to monitor the acceleration phase of the transfer beam from the standstill condition thereof and the other the deceleration phase of said transfer beam before stopping said beam, said pair of servo generators being coupled to the reference velocity data input via switching means putting one or the other servo generator into service in response to predetermined positions of said transfer beam and means responsive to the positions of said beam being provided to monitor said other servo generator.

2. Device for driving a transfer beam as set forth in claim 1, wherein said servo-generator monitoring the acceleration phase is an integrator of the adjustable slope type.

3. Device for driving a transfer beam as set forth in claim 1, wherein said other servo-generator monitoring the deceleration phase is a square root extractor and wherein said means for monitoring said other servo generator comprises a potentiometer coupled to the transmission member driving said pinion.

4. Device for driving a transfer beam as set forth in claim 1, wherein said electromagnetically controlled clutch and brake are of the so-called powder type.

* * * * *